United States Patent
Larson et al.

(10) Patent No.: US 8,876,405 B2
(45) Date of Patent: Nov. 4, 2014

(54) FIELD TERMINABLE OPTICAL CONNECTOR WITH SPLICE ELEMENT FOR JACKETED CABLE

(75) Inventors: Donald K. Larson, Cedar Park, TX (US); Wesley A. Raider, Hudson, WI (US); Daniel J. Treadwell, Austin, TX (US); Martin G. Afflerbaugh, Austin, TX (US); David Gonzalez, Austin, TX (US); Daniel H. Henderson, Austin, TX (US); William G. Allen, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 386 days.

(21) Appl. No.: 13/532,052

(22) Filed: Jun. 25, 2012

(65) Prior Publication Data

US 2012/0328248 A1 Dec. 27, 2012

Related U.S. Application Data

(60) Provisional application No. 61/501,563, filed on Jun. 27, 2011.

(51) Int. Cl.
*G02B 6/36* (2006.01)
*G02B 6/38* (2006.01)

(52) U.S. Cl.
CPC ............ *G02B 6/3846* (2013.01); *G02B 6/3887* (2013.01); *G02B 6/3821* (2013.01); *G02B 6/3893* (2013.01)
USPC ................... 385/81; 385/78; 385/86; 385/87; 385/98

(58) Field of Classification Search
None
See application file for complete search history.

(56) References Cited

U.S. PATENT DOCUMENTS

| | | | |
|---|---|---|---|
| 4,155,624 A | 5/1979 | Logan | |
| 4,588,256 A | 5/1986 | Onstott | |
| 4,824,197 A | 4/1989 | Patterson | |

(Continued)

FOREIGN PATENT DOCUMENTS

| | | | |
|---|---|---|---|
| JP | 60-250312 A | 12/1985 | |
| JP | 04-212112 A | 8/1992 | |

(Continued)

OTHER PUBLICATIONS

Product Brochure, "LC System Solution"; Panduit Corporation, Tinley Park, IL (Jun. 2004).

(Continued)

*Primary Examiner* — Hemang Sanghavi
(74) *Attorney, Agent, or Firm* — Kristofor L. Storvick; Gregg H. Rosenblatt

(57) ABSTRACT

An LC format optical connector for terminating an optical fiber includes a housing configured to mate with an LC receptacle. A backbone is configured to engage an outer surface of the outer shell of the housing and includes a mounting structure that is configured to engage a boot. A collar body is retained between the outer shell and the backbone and includes a fiber stub disposed in a first portion of the collar body, the fiber stub being mounted in a ferrule. A mechanical splice is disposed in a second portion of the collar body, the mechanical splice configured to splice the fiber stub to the optical fiber. The backbone also includes a fiber jacket clamping portion to clamp a jacket portion that surrounds a portion of the optical fiber upon actuation.

22 Claims, 11 Drawing Sheets

(56) References Cited

U.S. PATENT DOCUMENTS

| | | |
|---|---|---|
| 4,863,235 A | 9/1989 | Anderson |
| 4,892,378 A | 1/1990 | Zajac |
| 5,102,212 A | 4/1992 | Patterson |
| 5,138,681 A | 8/1992 | Larson |
| 5,155,787 A | 10/1992 | Carpenter |
| 5,159,653 A | 10/1992 | Carpenter |
| 5,185,844 A | 2/1993 | Bensel, III |
| 5,321,784 A | 6/1994 | Cubukciyan |
| 5,461,690 A | 10/1995 | Lampert |
| 5,481,634 A | 1/1996 | Anderson |
| 5,579,425 A | 11/1996 | Lampert |
| 5,638,474 A | 6/1997 | Lampert |
| 5,647,043 A | 7/1997 | Anderson |
| 5,719,977 A | 2/1998 | Lampert |
| 6,019,521 A | 2/2000 | Manning |
| D434,376 S | 11/2000 | Connelly |
| 6,206,581 B1 | 3/2001 | Driscoll |
| D446,501 S | 8/2001 | Donnell |
| 6,287,018 B1 | 9/2001 | Andrews |
| 6,302,596 B1 | 10/2001 | Cohen |
| 6,357,934 B1 | 3/2002 | Driscoll |
| 6,364,685 B1 | 4/2002 | Manning |
| D466,479 S | 12/2002 | Pein |
| 6,565,262 B2 | 5/2003 | Childers |
| D481,680 S | 11/2003 | Cheng |
| 6,816,661 B1 | 11/2004 | Barnes |
| 6,821,024 B2 | 11/2004 | Bates, III |
| 7,011,454 B2 | 3/2006 | Caveney |
| D523,396 S | 6/2006 | Shiraishi |
| D528,505 S | 9/2006 | Caveney |
| 7,104,702 B2 | 9/2006 | Barnes |
| 7,147,384 B2 | 12/2006 | Hardcastle |
| 7,178,990 B2 | 2/2007 | Caveney |
| 7,189,008 B2 | 3/2007 | Dye |
| 7,204,644 B2 | 4/2007 | Barnes |
| 7,280,733 B2 | 10/2007 | Larson |
| 7,369,738 B2 | 5/2008 | Larson |
| 7,393,148 B2 | 7/2008 | Allen |
| 7,556,438 B2 | 7/2009 | Oike |
| 7,637,673 B2 | 12/2009 | Oike |
| 7,785,017 B2 | 8/2010 | Barnes |
| 2001/0043777 A1 | 11/2001 | Lu |
| 2003/0063865 A1 | 4/2003 | Holmquist |
| 2003/0086657 A1 | 5/2003 | Viklund |
| 2003/0224657 A1 | 12/2003 | Malloy |
| 2005/0213892 A1 | 9/2005 | Barnes |
| 2005/0244108 A1 | 11/2005 | Billman |
| 2006/0072884 A1 | 4/2006 | Yamauchi |
| 2006/0269209 A1 | 11/2006 | Mullaney |
| 2007/0098331 A1 | 5/2007 | Mudd |
| 2007/0104425 A1 | 5/2007 | Larson |
| 2007/0127872 A1 | 6/2007 | Caveney |
| 2008/0248682 A1 | 10/2008 | Larkin |
| 2009/0010599 A1 | 1/2009 | Marrs |
| 2009/0269014 A1 | 10/2009 | Winberg |
| 2010/0098381 A1 | 4/2010 | Larson |
| 2011/0044588 A1 | 2/2011 | Larson |
| 2012/0027360 A1 | 2/2012 | Larson |
| 2012/0121222 A1* | 5/2012 | Castonguay et al. ............ 385/78 |
| 2014/0105552 A1* | 4/2014 | Sun .................................. 385/97 |

FOREIGN PATENT DOCUMENTS

| | | |
|---|---|---|
| JP | 06-018746 A | 1/1994 |
| JP | 3445479 | 6/2003 |
| JP | 2012-168569 A | 9/2012 |
| WO | WO 2006/019515 A1 | 2/2006 |
| WO | WO 2006/019516 A1 | 2/2006 |
| WO | WO 2011-052352 A1 | 5/2011 |

OTHER PUBLICATIONS

Product Specification, "FAST Connectors"; Optical Connectivity, AFL Telecommunications (Revision 3, Aug. 2006).

Product Brochure, "UniCam® Single-Mode APC Connectors (LC and SC Connectors)"; Corning Cable Systems LLC, Hickory, NC (Apr. 2007).

Product Brochure, "UniCam® Pretium®-Performance Single-Mode Connectors LC, SC, ST® Compatible"; Corning Cable Systems LLC, Hickory, NC (Apr. 2007).

Product Brochure, "UniCam® Pretium®-Performance Multi-Mode Connectors LC, SC, ST® Compatible"; Corning Cable Systems LLC, Hickory, NC (May 2007).

Product Brochure, "Opti-Snap™ SC APC, LC Compatible Single-Mode Field-Installable Connector"; Corning Cable Systems LLC, Hickory, NC (Jul. 2007).

International Search Report for PCT/US2012/044105, mailed on Jan. 30, 2013, 3 pp.

* cited by examiner

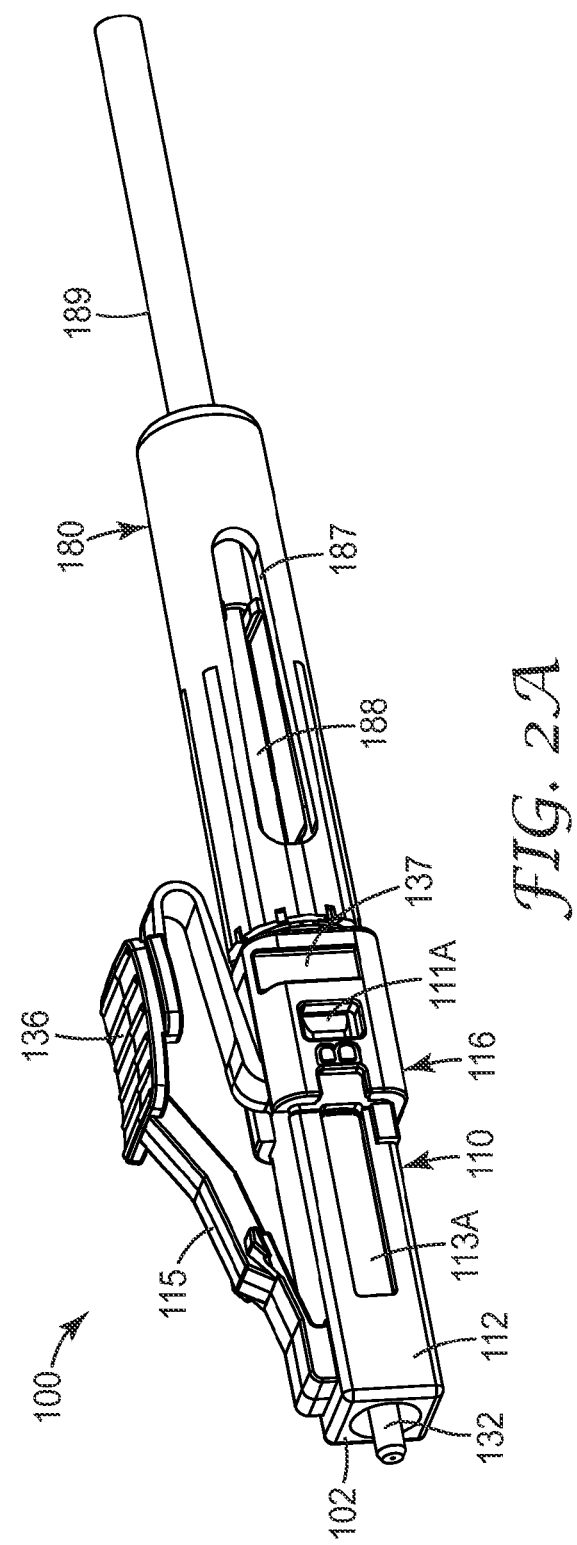

FIELD TERMINABLE OPTICAL CONNECTOR WITH SPLICE ELEMENT FOR JACKETED CABLE

CROSS REFERENCE TO RELATED APPLICATION

This application claims the benefit of U.S. Provisional Patent Application No. 61/501,563, filed Jun. 27, 2011, the disclosure of which is incorporated by reference herein in its entirety.

BACKGROUND OF THE INVENTION

1. Field of the Invention

The present invention is directed to an optical connector.

2. Related Art

Mechanical optical fiber connectors for the telecommunications industry are known. For example, LC, ST, FC, and SC optical connectors are widely used.

LC connectors were developed by Lucent as a small-form-factor optical connector in the early 1990s. These connectors have a size that is approximately one-half scale as compared to other standard connector formats. This smaller size permits higher packing densities in distribution frames, resulting in cost savings in the central office and data centers that used them.

The original LC connectors were made by inserting a bare fiber into a hollow ferrule and bonding the fiber into the ferrule with, typically, an epoxy-based adhesive. Conventional LC connector structures and fabrication information are described in U.S. Pat. No. 5,461,690; U.S. Pat. No. 5,579,425; U.S. Pat. No. 5,638,474; U.S. Pat. No. 5,647,043; U.S. Pat. No. 5,481,634; U.S. Pat. No. 5,719,977, and U.S. Pat. No. 6,206,581.

More recently, an LC connector has been developed that uses a hot-melt adhesive instead of an epoxy-based adhesive, as is described in U.S. Pat. No. 7,147,384.

Conventional LC connectors can require a multi-step polishing procedure that must be carefully performed in a controlled manner to achieve a high degree of polish on the end of the fiber and ferrule, while maintaining the proper spherical radius on the end of the ferrule, and while retaining a proper ferrule length. The amount of care needed for this connector preparation is further increased when the connector is an APC (angle polish connector) type.

With these types of requirements, these conventional connectors are not well suited for field installations. As mentioned above, an adhesive is required to mount standard LC connectors to an optical fiber. This process can be awkward and time consuming to perform in the field. Also, post-assembly polishing requires that the craftsman have a higher degree of skill.

Also known are hybrid optical splice connectors, as described in JP Patent No. 3445479, U.S. Pat. No. 7,637,673 and U.S. Pat. No. 7,556,438. However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

More recently, U.S. Pat. No. 7,369,738 describes an optical fiber connector that includes a pre-polished fiber stub disposed in ferrule that is spliced to a field fiber with a mechanical splice. Such a connector, called an NPC, is now commercially available through 3M Company. Small form factor connectors that are available include the Pretium LC (available from Corning), the Fast LC (available from Fujikura), the Opticam LC (available from Panduit), and Lightcrimp LC (available from Tyco). Another publication, US Publ. No. 2009/0269014 A1 describes a field terminable LC format optical connector with a splice element. Such a connector is also now commercially available through 3M Company.

Another field terminable optical connector is described in US Publ. No. 2011/0044588 A1, incorporated by reference herein in its entirety.

SUMMARY OF THE INVENTION

According to a first aspect of the present invention, an LC format optical connector for terminating an optical fiber includes a housing including an outer shell with an LC format and a front face configured to mate with an LC receptacle, the housing including a resilient latch disposed on a surface of the outer shell and configured to engage the LC receptacle. A backbone is configured to engage an outer surface of the outer shell on a first portion thereof and includes a mounting structure disposed on a second portion thereof that is configured to engage a boot. A collar body is disposed in the housing and retained between the outer shell and the backbone. The collar body includes a fiber stub disposed in a first portion of the collar body, the fiber stub being mounted in a ferrule and having a first end proximate to an end face of the ferrule and a second end. A mechanical splice is disposed in a second portion of the collar body, the mechanical splice configured to splice the second end of the fiber stub to the optical fiber. The backbone also includes a fiber jacket clamping portion to clamp a jacket portion that surrounds a portion of the optical fiber upon actuation. The boot actuates the fiber jacket clamping portion of the backbone upon attachment to the backbone.

In another aspect, an optical connector for terminating an optical fiber comprises a housing including an outer shell and a front face configured to mate with a receptacle of a corresponding format. A backbone is configured to engage an outer surface of the outer shell on a first portion thereof and includes a mounting structure disposed on a second portion thereof. A boot is configured to engage the mounting structure of the backbone. A collar body is disposed in the housing and is retained between the outer shell and the backbone. The collar body includes a fiber stub disposed in a first portion of the collar body, the fiber stub being mounted in a ferrule and having a first end proximate to an end face of the ferrule and a second end. The collar body includes rear portion having a slot formed in an outer surface at a rear end port thereof. A mechanical splice is disposed in a second portion of the collar body, the mechanical splice configured to splice the second end of the fiber stub to the optical fiber. The backbone also includes a fiber jacket clamping portion to clamp a jacket portion that surrounds a portion of the optical fiber upon actuation, and wherein the boot actuates the fiber jacket clamping portion of the backbone upon attachment to the backbone.

In yet another aspect, an optical connector for terminating an optical fiber from an FRP cable comprises a housing including an outer shell and a front face configured to mate with a receptacle of a corresponding format. A backbone is configured to engage an outer surface of the outer shell on a first portion thereof and includes a mounting structure disposed on a second portion thereof. A boot is configured to engage the mounting structure of the backbone. A collar body is disposed in the housing and is retained between the outer shell and the backbone. The collar body includes a fiber stub disposed in a first portion of the collar body, the fiber stub being mounted in a ferrule and having a first end proximate to an end face of the ferrule and a second end. The collar body includes rear portion having a slot formed in an outer surface at a rear end port thereof. A mechanical splice is disposed in a second portion of the collar body, the mechanical splice configured to splice the second end of the fiber stub to the optical fiber. The backbone also includes a fiber jacket clamping portion to clamp a jacket portion that surrounds a portion of the optical fiber upon actuation, and wherein the boot actuates the fiber jacket clamping portion of the backbone upon attachment to the backbone.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 2A is an isometric view of an optical connector with optical fiber cable prior to mating with a receptacle.

Figure 1A:
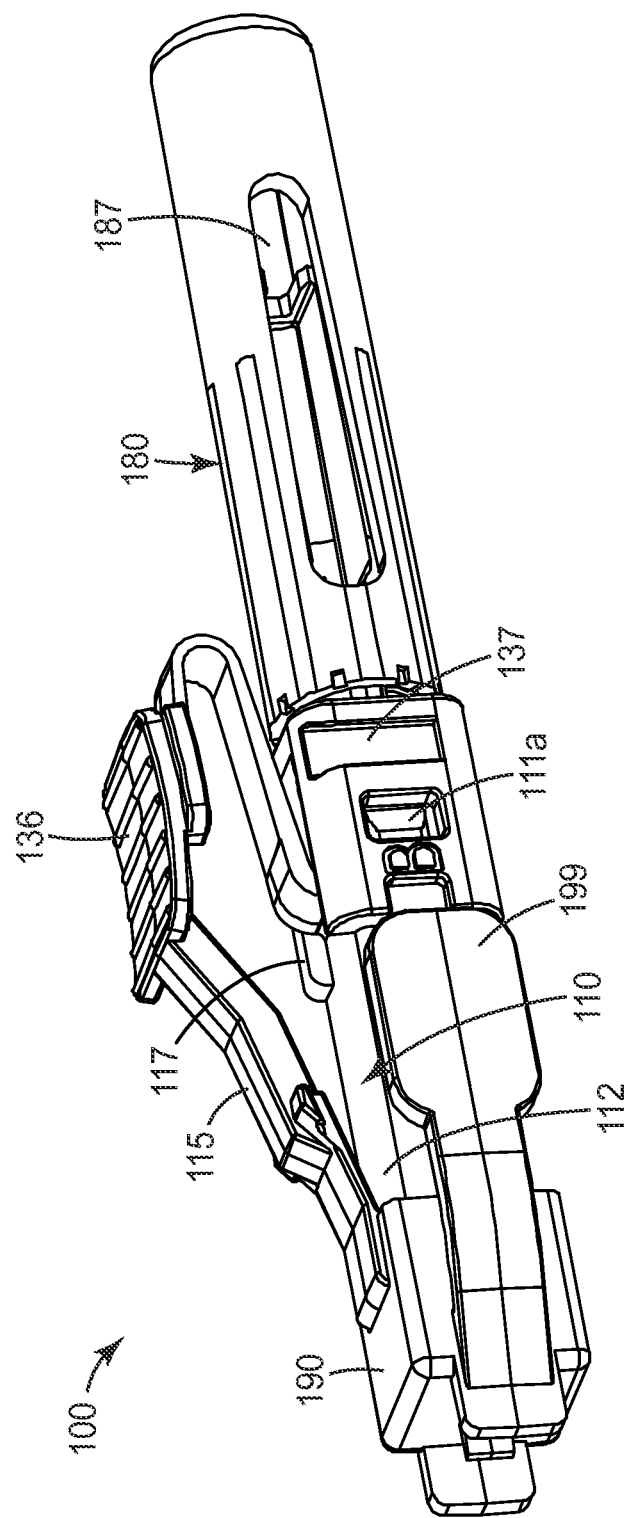
FIG. 1A is an isometric view of an optical connector according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical connector. In particular, the optical connector of the exemplary embodiments is an LC-format optical connector of compact length that is capable of straightforward field termination to a jacketed optical fiber cable. Further, the straightforward field termination can be accomplished without the use of a connector termination platform or separate crimping tool. The exemplary connector described herein can be readily installed and utilized for Fiber To The Home (FTTH) and/or Fiber To The X (FTTX) network installations. The exemplary connector can be utilized in installation environments that require ease of use when handling multiple connections, especially where labor costs are more expensive.

Figure 1B:
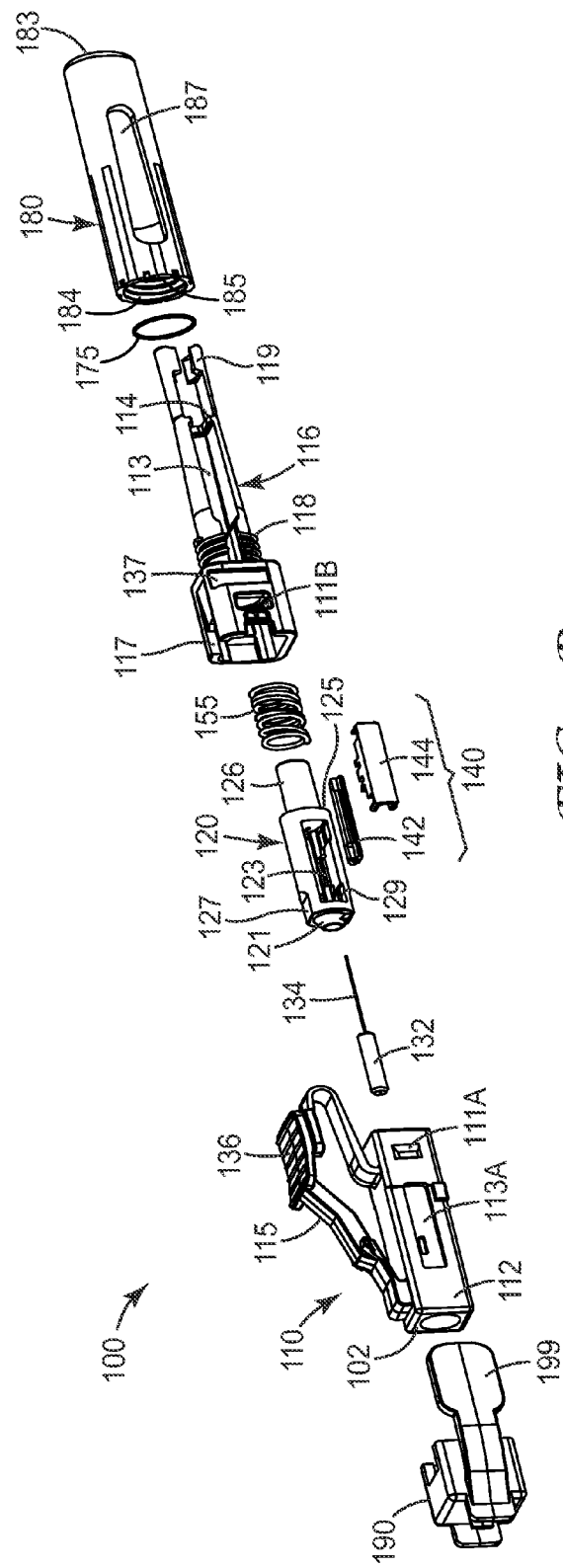
FIG. 1B is an exploded view of the optical connector of FIG. 1A.
Figure 1C:
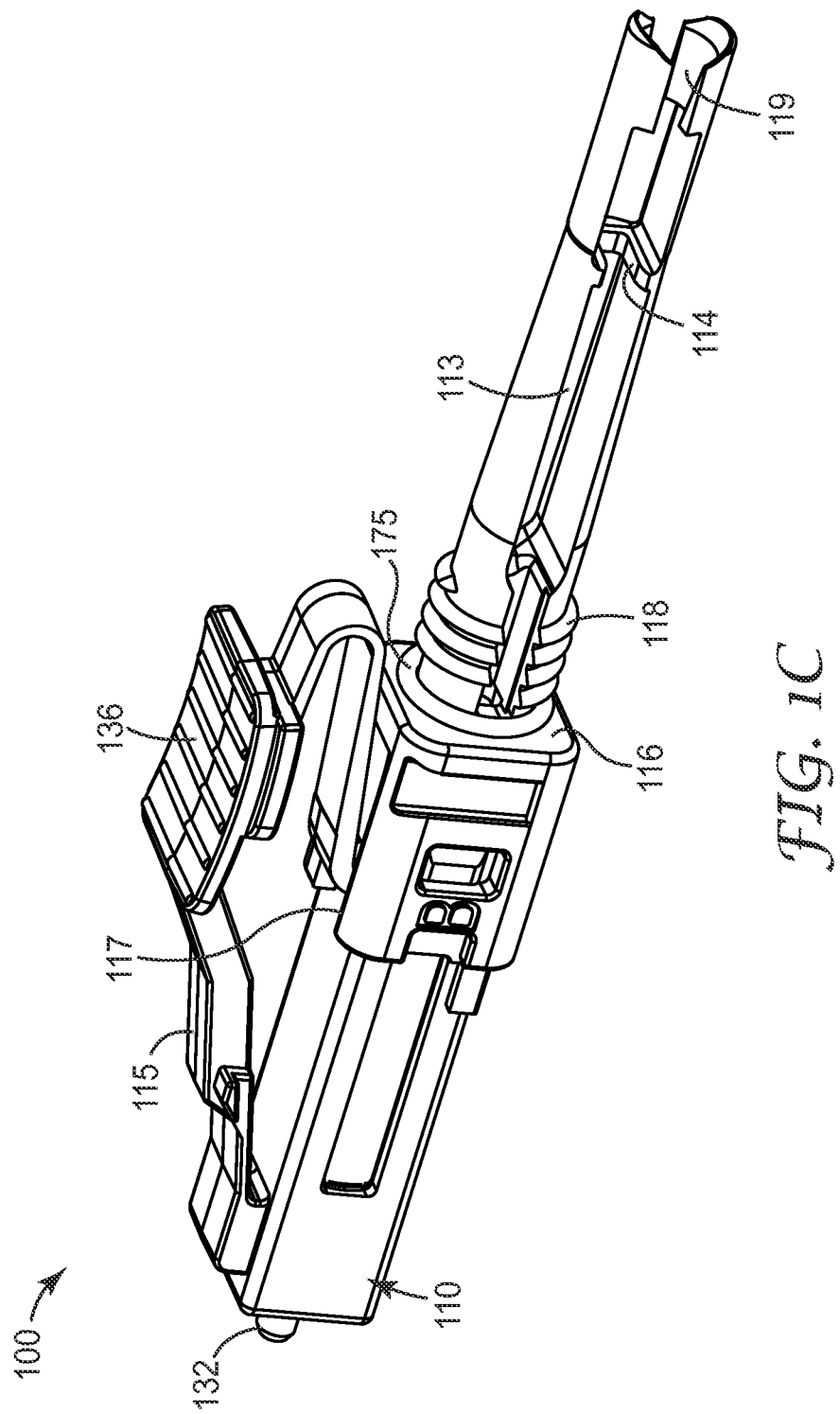
FIG. 1C is another isometric view of the exemplary optical connector of FIG. 1B with the boot removed.
Figure 1D:
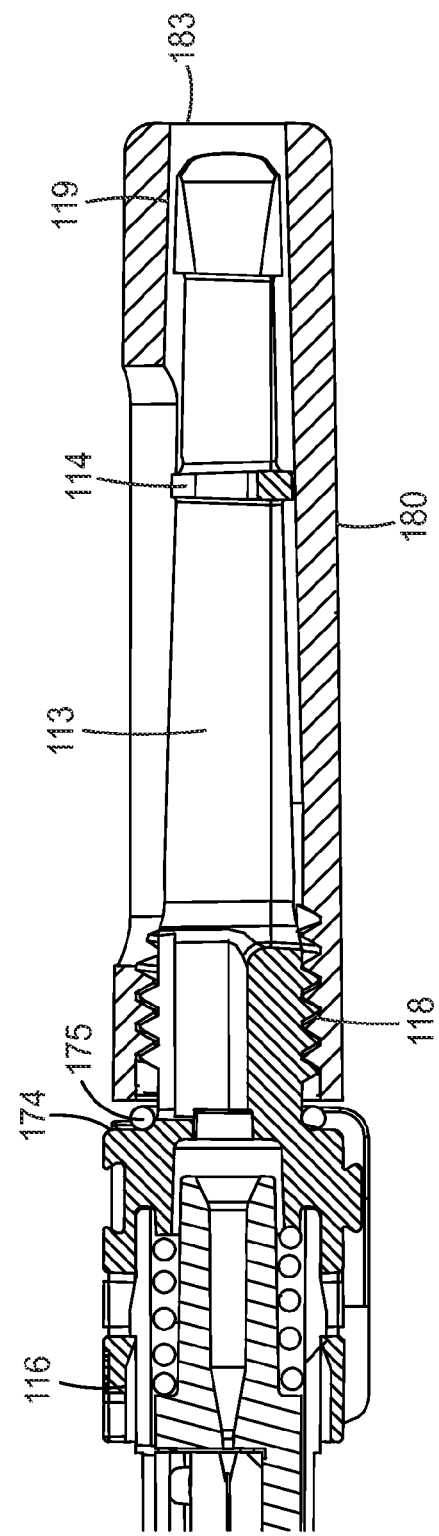
FIG. 1D is a partial cross section view of the boot and backbone of the optical connector of FIG. 1B.
Figure 1E:
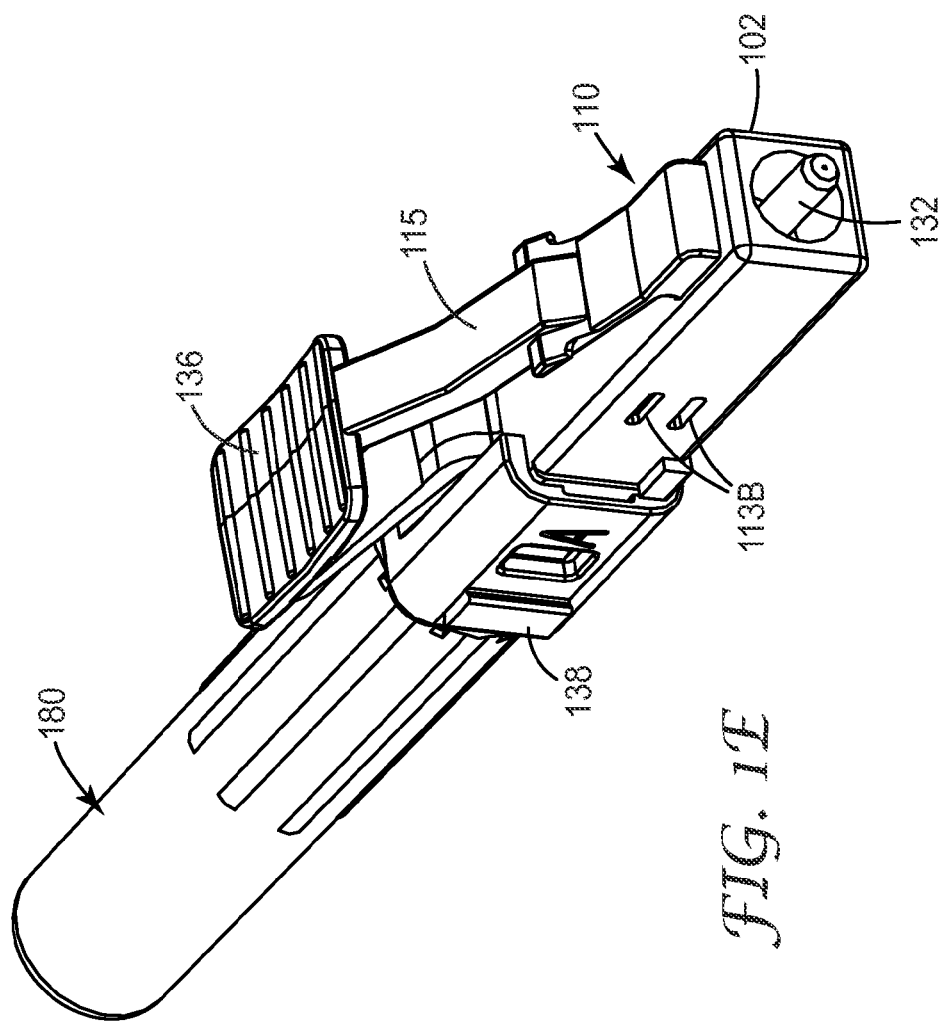
FIG. 1E is an isometric view of the optical connector of FIG. 1A from the opposite side.
Figure 2B:
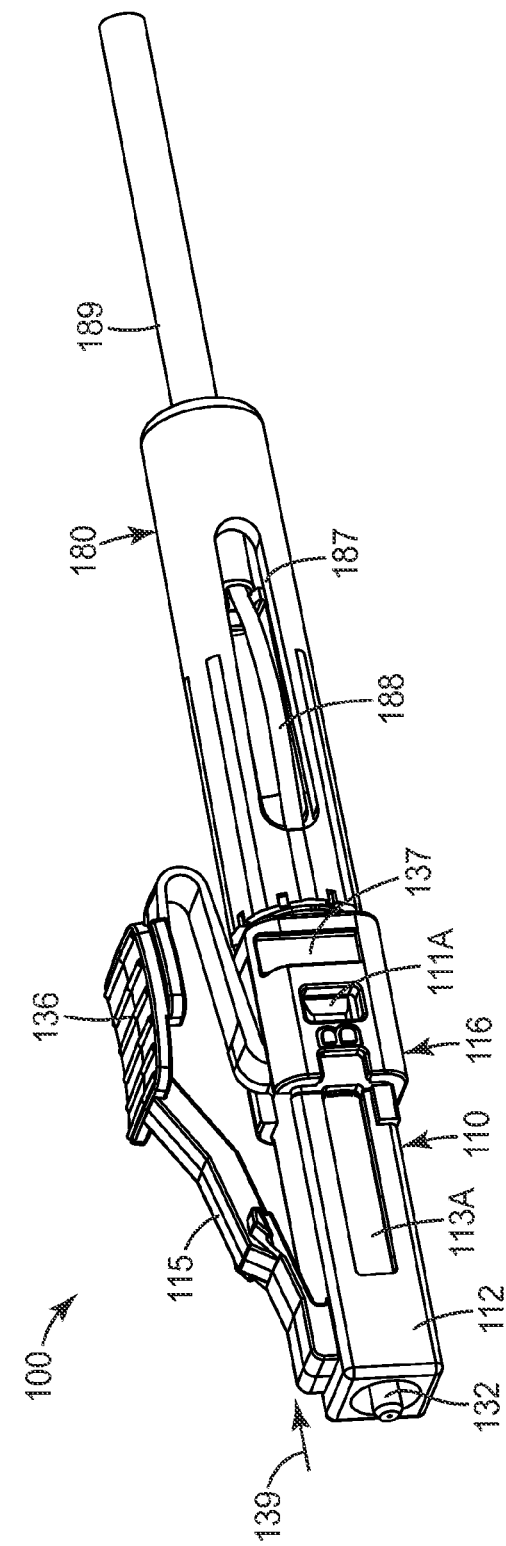
FIG. 2B is another isometric view of the optical connector of FIG. 2A.
Figure 3B:
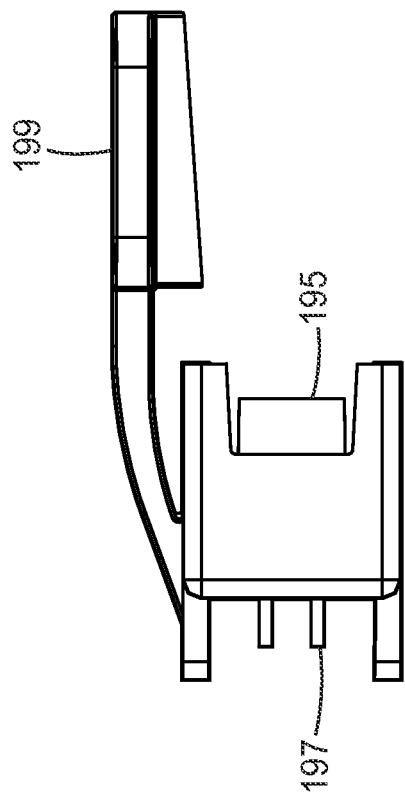
FIGS. 3A and 3B are isometric and side views, respectively, of the end cap according to another aspect of the invention.
Figure 3A:
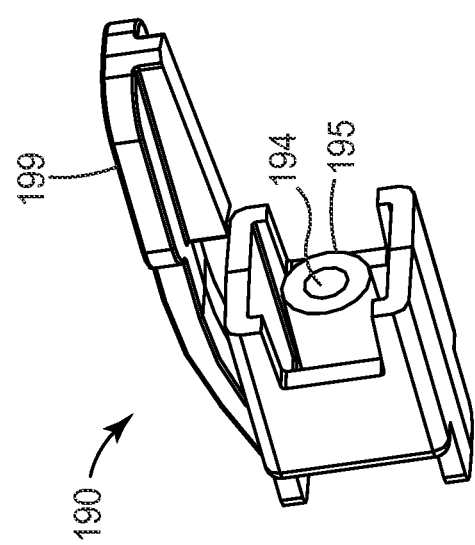

According to an exemplary embodiment of the present invention, an optical fiber connector 100 is shown in isometric view in FIGS. 1A, 1C, and 1E and in exploded view in FIG. 1B. FIG. 1D shows a close up cross sectional view of the backbone and boot elements of the connector. FIGS. 2A-2B show views of the optical fiber connector with a installed optical fiber cable before and after mating with a corresponding receptacle. FIGS. 3A and 3B show different views of an exemplary end cap.

Optical connector 100 is configured to mate with an LC receptacle. LC-type optical fiber connector 100 can include a connector body having a housing 110 and a fiber boot 180. In this exemplary embodiment, housing 110 includes an outer shell 112, having a front face or end 102 that is configured to be received in an LC receptacle (e.g., an LC coupling, an LC adapter, or an LC socket), and a backbone 116 (also referred to as a "clip") that provides further structural support and closes off the end of the connector to contain the ferrule 132, collar body 120, and spring 155 of the connector. Optionally, the optical connector 100 further includes a multipurpose end cap 190 that is configured to cover end 102 of the housing to protect the exposed portion of the ferrule 132. In addition, cap 190 further includes a cap actuator or driver 199 that is configured as a lever to contact and press against the splice cap of the connector, such as splice cap 144 of the mechanical splice 140 (described further below) when acted on by an installer.

Backbone 116 retains boot 180 and clamps onto the jacket of an optical fiber cable 189 (see e.g., FIG. 2A). Optical fiber cable 189 is a jacketed cable that includes an outer jacket, a coated (or inner jacket) portion 188 protecting the fiber (e.g., the bare clad/core), and strength members. In a preferred aspect, the strength members comprise aramid, Kevlar, or polyester yarn or strands disposed between an inner surface of the outer jacket and an outer surface of coated portion 188. The strength members can comprise straight or twisted strands. Optical fiber cable 189 can be a standard cylindrically shaped cable structure or it can be an alternatively shaped structure, such as a rectangular-shaped cable. For example, an FRP cable can be utilized (see e.g., FIGS. 5A and 5B).

Shell 112 has an outer LC-shaped body format. In addition, housing 110 includes a latch 115 disposed on an outer surface of shell 112 that is configured to engage an LC receptacle and secure the connector 100 in place. The latch 115 is depressable and has sufficient flexibility so that the connector can be disengaged/released from the LC receptacle when the latch is activated with a modest pressing force. In addition, the latch 115 extends rearward (i.e., away from the front face 102).

In this configuration, latch 115 is a single, contiguous latch that is formed on the outer shell 112 structure. In particular, the latch 115 is connected to the outer shell 112 at both the front end (near the ferrule tip) and rear end (near the backbone 116). The latch 115 further includes a driver surface 136, preferably formed as a large pad disposed near the rear end of the outer shell 112, that can be easily contacted by a user's thumb or other finger to depress the latch for removal of the connector 100 from a receptacle (e.g., an LC adapter/coupling (not shown)). Backbone 116 includes a slot 117 that allows the backbone 116 to be slid over the rear portion of the outer shell 112 and that accommodates the latch 115. Backbone 116 can be fastened to outer shell 112 via a snap fit mechanism 111A. Also, in this aspect, backbone 116 can include a coupling mechanism to couple connector 100 to another connector in a duplex or other multi-connector format. In a preferred aspect, the coupling mechanism comprises a dovetail protrusion 138 formed on a first side surface of the clip 116 (see FIG. 1E) and a corresponding slot 137 formed on an opposite side surface of clip 116 (see FIG. 1A). Slot 137 is configured to slidingly or snappingly engage a dovetail portion of an adjacent connector. In an exemplary aspect, a simple snap fit can be achieved when forming the backbone 116 from a hard material, such as a high yield strength, high modulus of elasticity material, such as Fortron PPS, available from Ticona Engineering Polymers.

In addition, for convenience of use in the field, the backbone 116 can include cable identification labels formed on opposite outer sides, such as an "A" on one side and a "B" on the other side (or a "1" and a "2", etc.).

Housing 110 also includes an opening 113A formed on a side of the shell 112 of sufficient size to allow for access to a mechanical splice 140 disposed therein (see further discussion below). Also, in one aspect, one or more access slots 113B can be provided in shell 112 opposite opening 113A to allow access to the mechanical splice from the opposite side.

In one aspect, the backbone 116 provides structural support for a substantial portion of the connector 100. In a further aspect, the backbone 116 is an elongated structure (having a length of from about 25 mm to about 35 mm, preferably about 30 mm) that also provides clamping for the optical fiber being terminated in the field. Moreover, the backbone 116 can provide further axial strain relief by providing a clamping surface for the strength members of the optical fiber being terminated.

Backbone 116 is shaped to engage with shell 112 by a sliding or snap fit over an outer surface of a rear portion of shell 112. A shoulder portion formed on an interior surface of backbone 116 provides a reaction face for the spring 155 to seat against. The spring 155 is positioned over an end portion 126 of the collar body 120 to provide and maintain an adequate contact force when two connectors are joined together.

Backbone 116 includes an opening at a front end (the end nearest the housing 110) to allow for insertion of the collar body 120.

Backbone 116 can further include a mounting structure 118 that provides for coupling to the fiber boot 180. In an exemplary aspect, the mounting structure comprises a threaded surface formed on an outer portion of backbone 116 that is configured to engage a corresponding threaded surface 184 of the boot 180. Also, the mounting structure 118 can provide a retention area for securing the strength members of the optical fiber cable being terminated.

In addition, the backbone can include a fiber guide 113 formed in an interior portion thereof to provide axial alignment support for the optical fiber cable being terminated. In an exemplary aspect, the fiber guide portion 113 is a channel or groove, which can be slightly tapered or chamfered that aligns the coated portion 188 of the optical fiber cable 189 and guides the fiber toward the mechanical splice device 140 housed in the collar body 120.

The backbone 116 also includes a collar body mount structure configured to receive and secure the collar body 120 within the backbone. In a preferred aspect, a rigid structure is formed in an interior region of backbone 116 having an axial bore therethrough of appropriate size to receive and engage an end structure 126 formed on an end portion of collar body 120.

Backbone 116 can further include one or more stops 114 formed on an interior portion thereof to provide a boundary for the insertion of the outer jacket of the optical fiber cable 189 being terminated (as explained in more detail below). In addition, backbone 116 includes a clamping portion 119 formed at one an end of the backbone. The clamping portion 119 is configured to clamp onto the outer jacket of the optical fiber cable 189 being terminated in connector 100. In a preferred aspect, clamping portion 119 comprises a collet-type, split body shape that is actuated when the boot 180 is secured to mounting structure 118. The clamping portion 119 can include raised inner surfaces to permit ready clamping of the outer cable jacket. In addition, the clamping portion 119 can have a more tapered shape for reliable gripping of the fiber cable outer jacket.

Figure 4:
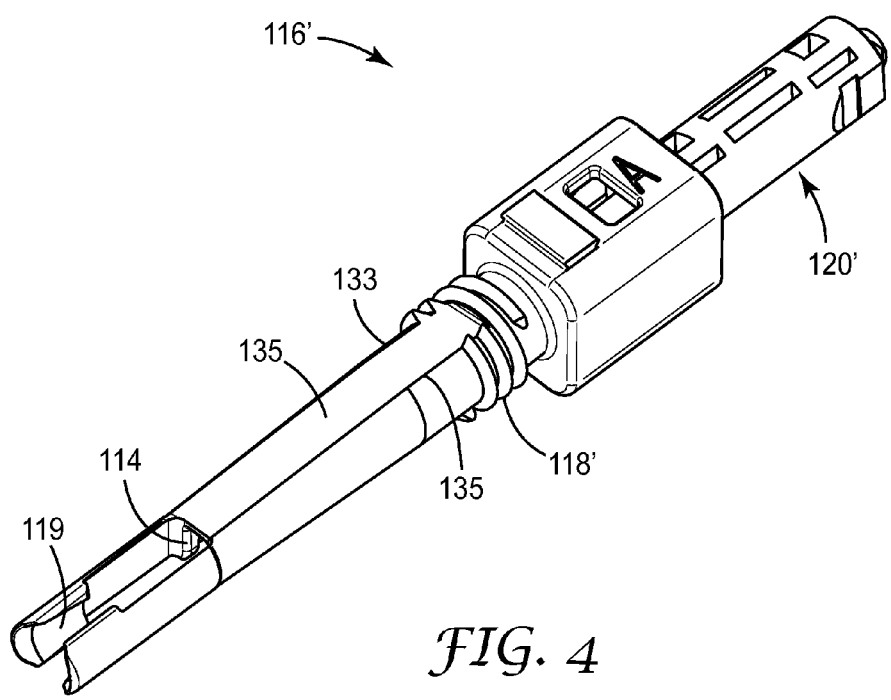
FIG. 4 is an isometric view of an alternative backbone according to another aspect of the invention.

An alternative backbone 116' is shown in FIG. 4. The backbone 116' further includes a solid, flattened backing portion 133, formed on one side of the fiber guide channel 113' (see FIG. 5B). This backing portion 133 provides clearance for the strength members of the optical fiber cable so that they can be easily disposed between the boot and the backbone, including the threaded mounting structure 118', to secure the strength members as the boot 180 is installed. In addition, the backing portion 133 can be bound by edges 135, which provide structures to help resist the wrapping of strength members around the backbone as the boot is turned during installation. Other features of backbone 116', such as the jacket clamping portion 119 and stops 114 can be the same as described above.

Figure 5A:
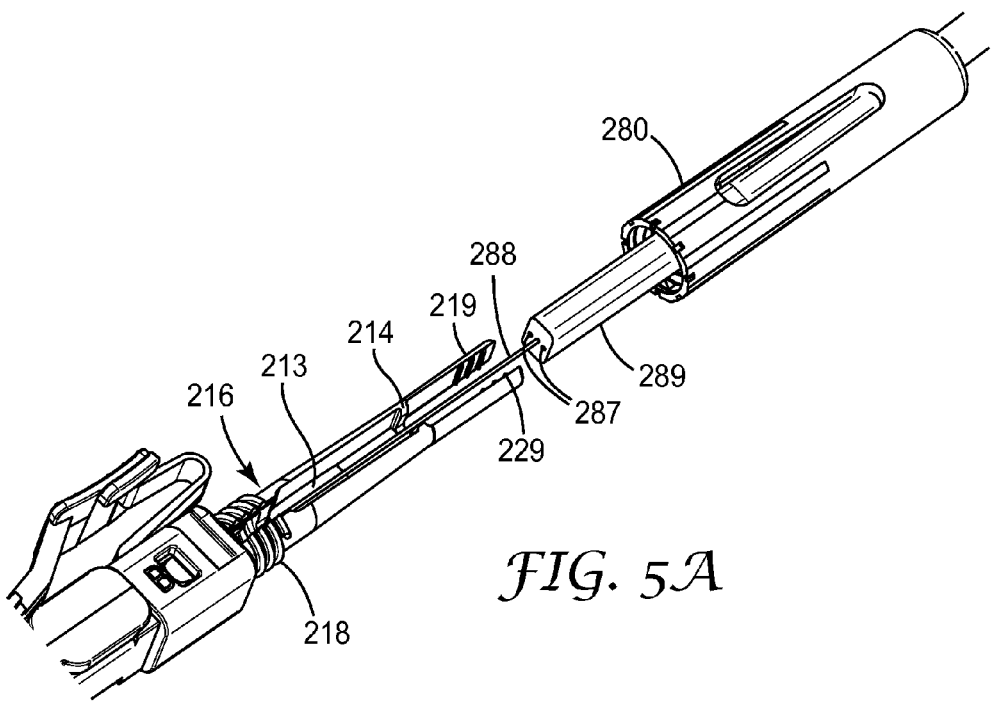
FIGS. 5A and 5B show isometric views of an alternative backbone according to another aspect of the invention.
Figure 5B:
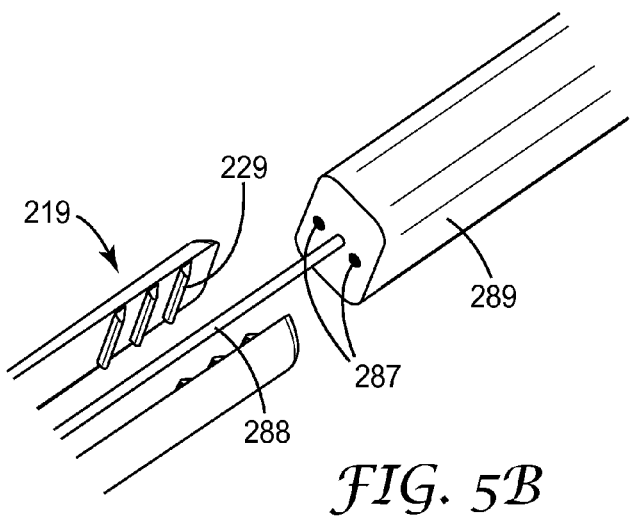

Another alternative backbone 216 is shown in FIGS. 5A and 5B. In this alternative aspect, the backbone 216 is configured to receive and secure an FRP cable 289. As shown in FIGS. 5A and 5B, FRP cable 289 has a rectangular cross-section and a coated portion 288 that surrounds the optical fiber. Strength members 287 are also provided. Strength members 287 can be formed from polymer-based rods (e.g., glass or Kevlar rods infused with polymer) or metal-based rods or wires. These strength members 287 can run lengthwise parallel to the coated fiber and are firmly secured within the cable jacket material. The backbone 216 can include a modified jacket clamping portion 219 that includes a set of edged protrusions or teeth 229 (shown in a more close-up view in FIG. 5B), formed on an inner surface thereof. The installation of the boot 280 onto the backbone 216 tightens the collet-style clamping portion 219 onto the outer jacket of the FRP cable 288. In this aspect, protrusions 229 are configured to clamp onto or dig into the jacket of FRP cable 289 when the jacket clamping portion 219 is actuated via the turning motion of the boot 280 on the threaded mounting structure 218. This jacket clamping action also secures the strength members 287 such that the clamped cable can withstand robust pulling forces. The backbone can include a fiber guide or opening 213 formed in an interior portion of the backbone to allow passage of the optical fiber. As with previous aspects, stops 214 can be provided to prevent further inserting of the cable jacket during installation. Other features of backbone 216 can be the same as described above.

In an alternative aspect, the connector can also include an adapter tube to be placed over the outer cable jacket of the optical fiber cable, for example, when the optical fiber cable being clamped is of a smaller diameter. In addition, the clamping portion 119 also can provide a guide structure when inserting fiber cable 189 during the termination process. Thus, boot 180 can be utilized to clamp the fiber strength members and the outer jacket. The interaction of the boot 180 and the backbone 116 will be described in greater detail below.

According to an exemplary embodiment of the present invention, housing 110/shell 112 and backbone 116 (or 116' or 216) are formed or molded from a polymer material, although metal and other suitably rigid materials can also be utilized. In a preferred aspect, the outer shell 112 is formed from a more flexible or pliant material than the backbone 116. Housing 110 is preferably slid within an inner surface of the front end of backbone 116 and secured in place via snap fit features 111A and 111B.

As mentioned above, connector 100 further includes a collar body 120 that is disposed within the connector housing and retained by the backbone. According to exemplary embodiments, the collar body 120 is a multi-purpose element that can house a ferrule 132 and optical fiber stub 134 and a mechanical splice device 140. The collar body is configured to have some limited axial movement within housing 110. For example, the collar body 120 can include a collar or shoulder 125 that can be used as a flange to provide resistance against spring 155 (see FIG. 1B), interposed between the collar body and the backbone portion. According to an exemplary embodiment of the present invention, collar body 120 can be formed or molded from a polymer material, although metal and other suitable materials can also be utilized. For example, collar body 120 can comprise an injection-molded, integral material.

In particular, collar body 120 includes a first end portion having an opening to receive and house a ferrule 132 having an optical fiber stub 134 secured therein. The collar body also includes a second end portion 126 configured to fit within the backbone 116. The collar body 120 is secured between backbone 116 and shell 112 when snap fit feature 111A is slid over snap fit feature 111B.

The collar body 120 also secures the fiber stub and ferrule in place in the connector 100. Ferrule 132 can be formed from a ceramic, glass, plastic, or metal material to support the optical fiber stub 134 inserted and secured therein. In a preferred aspect, ferrule 132 is a ceramic ferrule.

The collar body can include a keyed or flattened surface portion or portions 127 to ensure proper alignment within the connector housing as the collar body moves within the housing during use. This rotational alignment can be further advantageous when utilizing a factory-polished angle-polished connector (APC) ferrule. Alternatively, both the ferrule and collar body can include corresponding keying features to maintain rotational alignment.

Figure 6A:
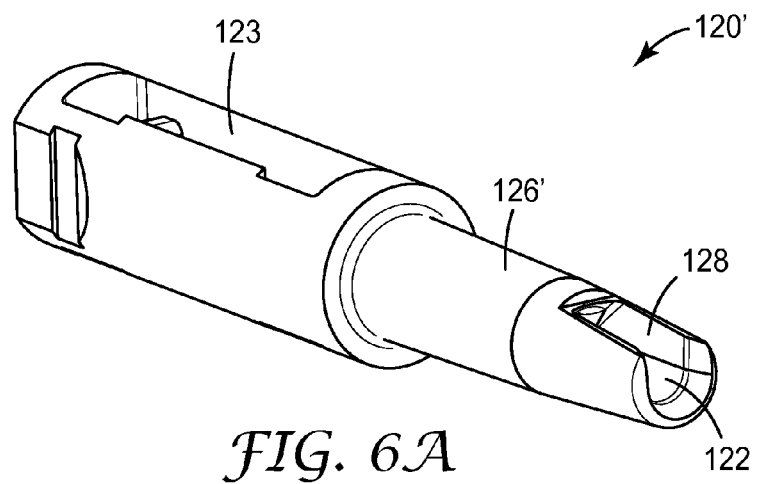
FIG. 6A is an isometric view of an alternative collar body according to another aspect of the invention.
Figure 6B:
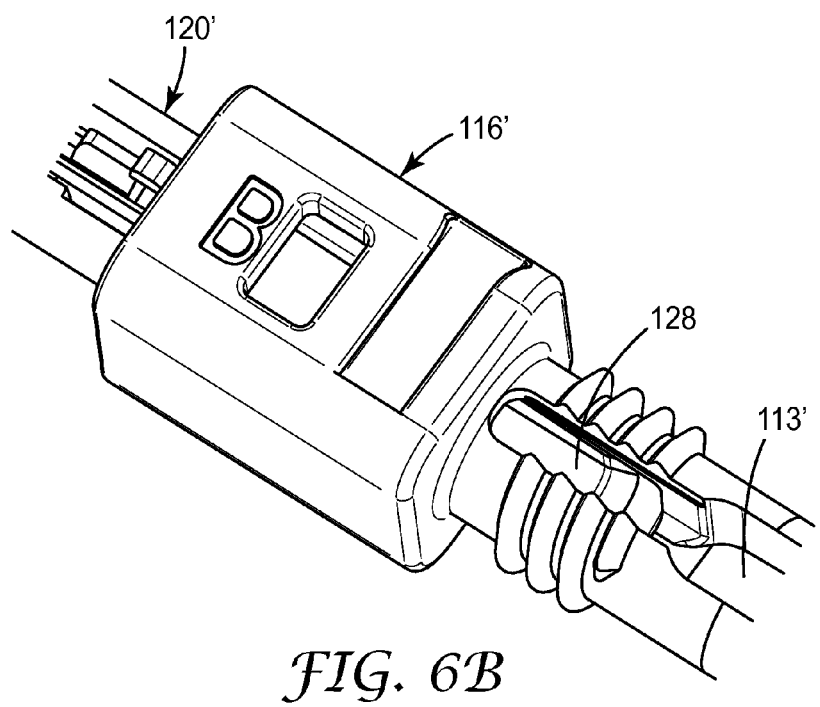
FIG. 6B is a close up partial view of the alternative collar body of FIG. 5A mounted inside a backbone according to another aspect of the invention.

An alternative collar body 120' is shown in close-up view in FIG. 6A. In this alternative aspect, the rear portion 126' of the collar body 120' further includes a slot or cut-out portion 128 formed on the outer surface of the rear portion 126' at the location of the rear port 122. This slot 128 can correspond to an outer surface opening of up to 180 degrees (or nearly half-cylinder trough-type shape). The slot can be uniform or tapered (e.g., wider near the opening 122). The slot 128 allows an installer to "drop" the tip of the field fiber into the collar body. As shown in FIG. 6B, the slot 128 can be aligned with the opening of the fiber guide channel 113' to allow the field technician to drop the fiber into the collar body. Thus, this alternative collar body configuration can further simplify the field termination process (described in more detail below) of the connector, as threading a fiber end straight through the rear port may result in multiple attempts if the fiber tip is impeded by an edge.

In addition, the shape of the rear portion 126' of the collar body 120' can be tapered from a greater outer diameter (closer to the splice element housing portion 123) to a smaller outer diameter (at the rear port 122). Thus, a clearance space can be created between an inner wall of the backbone 116' and the outer surface of the rear portion 126' of the collar body 120'. In this manner, the collar/ferrule will be better isolated from a sideways force when the cable/boot experiences a side pull.

It should be noted that the alternative collar body 120' shown in close-up view in FIG. 6A can be configured to be implemented with a wide variety of field terminable optical connectors, including SC format optical connectors, as would be apparent to one of skill in the art given the present description.

An optical fiber stub 134 is inserted through the ferrule 132, such that a first fiber stub end slightly protrudes from or is coincident or coplanar with the end face of ferrule 132. Preferably, this first fiber stub end is factory polished (e.g., a flat or angle-polish, with or without bevels). A second end of the fiber stub 134 extends part-way into the interior of the connector 100 and is spliced to the fiber portion of optical fiber cable 189. Preferably, the second end of fiber stub 134 can be cleaved (flat or angled, with or without bevels).

In one aspect, the second end of fiber stub 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

Fiber stub 134 and the fiber from optical fiber cable 189 can each comprise standard single mode or multimode optical fiber, such as SMF 28 (available from Corning Inc.). In an alternative embodiment, fiber stub 134 additionally includes a carbon coating disposed on the outer clad of the fiber to further protect the glass-based fiber. In an exemplary aspect, fiber stub 134 is pre-installed and secured (e.g., by epoxy or other adhesive) in ferrule 132, which is disposed in the first end portion of collar body 120. Ferrule 132 is preferably secured within collar body first end portion via an epoxy or other suitable adhesive. Preferably, pre-installation of the fiber stub can be performed in the factory.

Collar body 120 further includes a splice element housing portion 123. In an exemplary aspect, splice element housing portion 123 provides an opening in which a mechanical splice element 142 can be inserted and secured in the central cavity of collar body 120. In an exemplary embodiment, mechanical splice element 142 is similar to a mechanical splice device (also referred to herein as a splice device or splice), such as a 3M™ FIBRLOK™ mechanical fiber optic splice device, available from 3M Company, of Saint Paul, Minn. One or more retainer elements 129, such as overhang tabs, can be used to secure the element 142 in axial and/or height position prior to actuation of the cap. In this manner, the splice device 140 cannot be rotated, or easily moved forward or backward once installed.

For example, commonly owned U.S. Pat. No. 5,159,653, incorporated herein by reference in its entirety, describes an optical fiber splice device (similar to a 3M™ FIBRLOK™ II mechanical fiber optic splice device) that includes a splice element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. In addition, a conventional index matching fluid can be preloaded into the V-groove region of the splice element for improved optical connectivity within the splice element. In another aspect, no index matching fluid is utilized.

In this exemplary aspect, the splice element 142 can be configured similar to the splice element from a 3M™ FIBRLOK™ II mechanical fiber optic splice device or a 3M™ FIBRLOK™ 4×4 mechanical fiber optic splice device. Other conventional mechanical splice devices can also be utilized in accordance with alternative aspects of the present invention. Some example conventional mechanical splices are described in U.S. Pat. Nos. 4,824,197; 5,102,212; 5,138,681; and 5,155,787, each of which is incorporated by reference herein, in their entirety.

As mentioned above, the optical connector 100 further includes a multipurpose end cap 190 that is configured to cover end 102 of the housing to protect the exposed portion of the ferrule 132. As shown in FIG. 3A, end cap 190 includes a first portion 195 that is configured to fit over the end face of ferrule 132. In this exemplary aspect, a small well 194 is formed in end cap portion 195 and has an inner diameter slightly larger than the outer diameter of the ferrule 132. In this manner, the end cap can be placed onto the front end of the connector housing 110 (see FIG. 1A) and protect the ferrule from dust or other contaminants. The end cap 190 also includes a second portion having protruding or extending pin structures 197 (see FIG. 3B) that can be used to displace the splice cap 144 of the splice device when needed for fiber repositioning or removal within splice element 142, as explained further below. In addition, cap 190 further includes a cap actuator or driver 199 that is configured to contact and press against the splice cap of the connector, such as splice cap 144 of the mechanical splice 140. While FIG. 1A shows the end cap 190 positioned such that that the driver 199 is disposed over the location of the mechanical splice device, the orientation of the end cap 190 can also be changed such that driver can be placed over a different side of the housing and the front end of the housing is still protected. As such, inadvertent actuation of the splice device can be avoided.

Mechanical splice element 142 allows a field technician to splice the second end of fiber stub 134 to a stripped fiber portion of an optical fiber cable 189 at a field installation location. In an exemplary embodiment, splice device 140 can include splice element 142 and an actuating cap 144. In operation, as the cap 144 is moved from an open position to a closed position, one or more cam bars located on an interior portion of the cap 144 can slide over the splice element legs, urging them toward one another. Two fiber ends, (e.g., one end of fiber stub 134 and one end of the fiber from optical fiber cable 189) are held in place in grooves formed in the splice element and butted against each other and are spliced together in a channel, such as a V-groove channel to provide sufficient optical connection, as the element legs are moved toward one another.

Splice element 142 is mountable in a mounting device or cradle located in portion 123 of collar body 120. In an exemplary embodiment, the cradle is integrally formed in collar body 120, e.g. by molding, and can secure (via a snug or snap-fit) the axial and lateral position of the splice element 142. The retainer elements 129 can be configured to hold the splice element such that the splice device cannot be rotated or easily moved forward or backward once installed.

In accordance with another aspect of the invention, while the end cap 190 is positioned over the front end of housing 110, such as is shown in FIG. 1A, a user can press onto driver 199, which is positioned over opening 113A of the housing and opening 123 of the collar body 120, 120', where the mechanical splice element is positioned, to actuate the splice device.

The mechanical splice allows a field technician to splice the second end of fiber stub 134 to the fiber of the optical fiber cable 189 at a field installation location. The term "splice," as utilized herein, should not be construed in a limiting sense since splice device 140 can allow removal of a fiber. For example, the element can be "re-opened" after initial actuation, where the splice element housing portion can be configured to allow for the removal of the splice cap if so desired. This configuration permits repositioning of the spliced fibers, followed by replacement of the cap to the actuating position. For example, as mentioned above, the end cap 190 can include a structure, such as extending pins 197, shown in FIG. 3B, that can be inserted in a side of housing 110 to disengage actuating cap 144, to allow for reopening of the splicing element 142 within the collar body 120, 120' for splice removal or repositioning.

As mentioned above, fiber boot 180 can be utilized for several purposes with optical connector 100. Boot 180 includes a tapered body (see e.g., FIG. 1D) having an axial bore throughout. The boot 180 includes threaded surface 184 (see FIG. 1B) formed on an inner surface of the body at the opening 185, where the grooves are configured to engage with the correspondingly threaded mounting structure 118, 118' of the backbone 116, 116'. In addition, the axial length of boot 180 is configured such that a rear section 183 of the boot, which has a smaller opening than at front opening 185, engages the jacket clamp portion 119 of the backbone. For example, as is explained in more detail below, as the boot 180 is secured onto the mounting structure 118, 118' of the backbone, the axial movement of the boot relative to the backbone forces the legs of clamp portion 119 to move radially inwards so that the outer jacket of the optical fiber cable 189 is tightly gripped. Also, the strength members of the optical fiber cable can be disposed between the boot and the threaded mounting structure 118, 118' to secure the strength members as the boot is installed.

In another aspect of the invention, the optical fiber connector 100 can further include an elastomeric o-ring 175 or similarly-shaped compliant object disposed between the boot 180 and a rear surface 174 (see FIG. 1D) of the backbone 116. The o-ring 175 can be pre-mounted to the mounting structure 118, 118', 218 of the backbone 116, 116', 216 and provides extra friction to help keep strength members in place when the boot is secured onto the backbone 116, 116', 216. For example, the strength members can be gripped tightly between the end of the boot and the o-ring 175. This construction can also provide a connector termination capable of surviving rougher handling and greater pull forces.

In accordance with another aspect of the invention, the boot 180 further includes a boot slot 187 (see e.g., FIG. 1B) longitudinally formed through a portion of the boot 180. During a connector engagement sequence, when the connector 100 is mated to another LC connector or receptacle, the ferrule is compressed and may cause a portion of the optical fiber of the optical fiber cable 189 to bow outward (see e.g., FIGS. 2A and 2B and the discussion further below). The slot 187 allows the fiber to bow outward beyond the inner surface of the boot. This configuration also allows for the overall connector length to be kept at a minimum while assuring the fiber radius is kept large for low bend losses and high fiber lifetime. Note that the number of internal threads on the boot 180 can be configured such that the position of the boot slot 187 matches the opening 113, 113' of the backbone 116, 116', 216.

The boot slot 187 also allows the installer to verify proper connector assembly. For example, excess tension on the strength members during installation may cause an excess fiber bow in the boot. The boot slot 187 allows the installer to correct for improper termination by loosening the boot, pulling back on the fiber cable, and tightening the boot again. In addition, the boot slot 187 provides visual verification that the connector has mated properly with another connector as the fiber bows after mating.

In an exemplary aspect, boot 180 is formed from a rigid material. For example, one exemplary material can comprise a fiberglass reinforced polyphenylene sulfide compound material. In another aspect, the materials used to form the boot 180 and the backbone 116, 116', 216 are the same.

An exemplary fiber cable utilized in this embodiment comprises a 3.0 mm jacketed drop cable, commercially available from Samsung Cable, Thai-han Cable, and others (all of Korea). Another exemplary cable comprises an FRP drop cable. As would be understood by one of ordinary skill in the art given the present description, the optical connector of the exemplary embodiments can be configured to terminate the fibers of other types of jacketed drop cable, including 3.5 mm drop cable, and others.

As mentioned above, the optical fiber connector of the exemplary embodiments is of compact length and is capable of straightforward field termination without the use of a connector termination platform or separate crimping tool. An exemplary termination process will now be described.

For field termination, the optical fiber of the optical fiber cable 189 is prepared by cutting of a portion of the outer cable jacket and stripping off a coated portion of the fiber near the terminating fiber end to leave a bare fiber portion and cleaving (flat or angled) the fiber end to match the orientation of the pre-installed fiber stub 134. In an exemplary aspect, about 50 mm of the outer jacket can be removed. About 30 mm of the coated portion can also be removed, leaving about 30 mm of bare fiber prior to cleaving. For example, a commercial fiber cleaver such as an Ilsintech MAX CI-01 or the Ilsintech MAX CI-08, available from Ilsintech, Korea (not shown) can be utilized to provide a flat or an angled cleave. In a preferred aspect, about 8 mm of bare fiber remains after cleaving. No polishing of the fiber end is required, as a cleaved fiber can be optically coupled to the fiber stub 134 in the splice device. The boot 180 can be slid over the fiber cable 189 for later use.

The collar body 120, with ferrule 132 secured therein, can be inserted into the opening of the backbone 116. The collar body 120 is secured between backbone 116 and shell 112 when snap fit feature 111A is slid over snap fit feature 111B. This step may be performed prior to the field termination process or during the field termination process. The spring 155 will provide some bias against axial movement after fiber insertion.

The optical fiber cable 189 can be inserted through the rear end of the connector (i.e., through the clamping portion 119 of the connector backbone). In an alternative aspect, for a connector having a slotted collar body, such as is shown in FIGS. 6A and 6B, the connector can be oriented so that a fiber tip portion of the optical fiber cable 189 can be simply dropped into the back end 126' of the collar body 120' prior to inserting the fiber further into the connector body.

In this manner, the prepared fiber end can be spliced to the fiber stub with the mechanical splice device 140. The fiber cable 189 is continually inserted until the coated portion of the fiber begins bowing (which occurs as the end of the cable fiber meets the fiber stub 134 with sufficient end loading force). In addition, the stops 114 formed on an interior portion of the backbone 116, 116' provide a boundary to stop further insertion of the jacketed portion of the optical fiber cable 189.

The splice device can then be actuated while the fibers are subject to an appropriate end loading force. To actuate the splice device, a user can place the end cap 190 over the front end of the housing such that the driver 199 is positioned over the splice device 140. The user can press onto the driver 199 with one hand and simultaneously compress the jacket clamp portion 119 of the backbone by applying a modest, inward force with the other hand. The fiber jacket can then be released at clamping portion 119, thereby removing the fiber bow.

The boot 180 (which is previously placed over fiber cable 189) is then pushed onto the backbone 116. The boot 180 can be pushed axially toward the backbone mounting section 118 and then screwed onto the backbone mounting section 118, 118' to secure the boot 180 in place. As mentioned above, the installation of the boot 180 onto the backbone 116, 116' tightens the collet-style clamping portion 119 onto the outer jacket of the fiber cable. During this installation, the user can hold the strength members in place over the mounting structure 118, 118' by application of a modest force (e.g., by thumb pressure). As the boot is screwed onto the backbone, the strength members are pinched onto the o-ring 175. After completion of the boot installation, the excess strength members can be removed (e.g., cut away).

As mentioned above, the boot slot 187 permits a fiber bow upon engagement of the optical connector 100 with another connector. As shown in FIG. 2A, optical connector 100 includes an optical fiber cable 189 having a coated portion 188 that is shown through boot slot 187. Prior to engagement with another LC connector or receptacle, the end of ferrule 132 extends beyond the end face 102 of the housing. FIG. 2B represents connector 100 after it has been mated with another LC connector or receptacle. In this view, the end of ferrule 132 is displaced inward (with respect to the front face of the housing) in the direction of arrow 139. Because the outer jacket of cable 189 is being gripped by portion 119 of the backbone, which is secured by boot 180, a fiber bow is created in the covered or coated portion 188 of optical fiber cable 189. Thus a portion of the optical fiber may bow beyond the inner surface of the boot 180.

In an alternative aspect, the optical fiber connector can comprise a latch made from a two piece construction. In this alternative aspect, a trigger portion (not shown) can be disposed between the boot 180 and backbone 116, 116'. The trigger can include a forward extending latch portion that is configured to mate with a rearward extending latch portion formed on the housing/shell.

Thus, the above termination procedure can be accomplished without the use of any additional fiber termination platform or specialized tool. The optical connector is reusable in that the splice cap can be removed and the above steps can be repeated. Of course, in alternative aspects, a termination platform tool can be utilized at the installer's choice. Alternative field termination platform constructions can be similar to those described in U.S. Pat. No. 7,369,738.

The connector described above can be used in many conventional optical connector applications. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. The connector can also be utilized in wireless tower applications for termination with remote radio units.

As mentioned above, the connector of the exemplary embodiments is of compact length and is capable of straightforward field termination with reduced assembly times. Such exemplary connectors can be readily installed and utilized for FTTP and/or FTTX network installations, such as part of a fiber distribution unit.

The LC connector design can further provide for more compact configurations in other outside plant applications, such as pedestals, closures, terminals, and fiber NIDS, to name a few. The connectors having a collar body with a slotted end portion can provide more straightforward field termination.

Various modifications, equivalent processes, as well as numerous structures to which the present invention may be applicable will be readily apparent to those of skill in the art to which the present invention is directed upon review of the present specification.

We claim:

1. An LC format optical connector for terminating an optical fiber, comprising:
    a housing including an outer shell with an LC format and a front face configured to mate with an LC receptacle, the housing including a resilient latch disposed on a surface of the outer shell and configured to engage the LC receptacle;
    a backbone configured to engage an outer surface of the outer shell on a first portion thereof and that includes a mounting structure disposed on a second portion thereof;
    a boot configured to engage the mounting structure of the backbone;
    a collar body disposed in the housing and retained between the outer shell and the backbone, wherein the collar body includes a fiber stub disposed in a first portion of the collar body, the fiber stub being mounted in a ferrule and having a first end proximate to an end face of the ferrule and a second end; and
    a mechanical splice disposed in a second portion of the collar body, the mechanical splice configured to splice the second end of the fiber stub to the optical fiber, wherein the backbone also includes a fiber jacket clamping portion to clamp a jacket portion that surrounds a portion of the optical fiber upon actuation, and wherein the boot actuates the fiber jacket clamping portion of the backbone upon attachment to the backbone.

2. The LC format optical connector of claim 1, wherein the resilient latch comprises a single-piece latch having a driver formed thereon that is configured to receive a pressing force that disengages the latch from the LC receptacle.

3. The LC format optical connector of claim 1, further comprising an end cap configured to protect an exposed face of the ferrule and mountable on a front face of the housing.

4. The LC format optical connector of claim 3, wherein the end cap further comprises a driver configured to actuate the mechanical splice.

5. The LC format optical connector of claim 4, wherein the end cap is configured such that the driver is positioned over the mechanical splice when the end cap is mounted on the front face of the housing.

6. The LC format optical connector of claim 1, wherein the collar body includes rear portion having a slot formed in an outer surface at a rear end port thereof.

7. The LC format optical connector of claim 6, wherein the rear end portion is tapered towards the rear end port.

8. The LC format optical connector of claim 1, further comprising an elastomeric structure disposed on the mounting structure of the backbone and configured to engage strength members of the optical fiber when the boot is mounted on the mounting structure.

9. The LC format optical connector of claim 1, wherein the boot includes a longitudinal slot formed along a portion of its length that permits the spliced optical fiber to bow outward unrestrained by the boot when engaged with the LC receptacle.

10. The LC format optical connector of claim 1, wherein the backbone includes a flattened backing portion formed on one side of a fiber guide channel.

11. The LC format optical connector of claim 1, wherein the mechanical splice device comprises a splice element and an actuating cap.

12. The LC format optical connector of claim 1, wherein the fiber jacket clamping portion comprises a collet-type, split body shape.

13. The LC format optical connector of claim 1, wherein the boot attaches to the backbone view a screw-type mechanism.

14. The LC format optical connector of claim 1, wherein the backbone further comprises a fiber guide.

15. The LC format optical connector of claim 1, wherein the backbone includes stops formed on an inner surface thereof to prevent passage of a jacketed fiber from further insertion.

16. The LC format optical connector of claim 1, wherein the backbone further comprises an integral coupling mechanism to couple the LC format optical connector to a second LC format optical connector in a multiple connector format.

17. The LC format optical connector of claim 16, wherein the coupling mechanism comprises a dovetail protrusion formed on a first side surface of the backbone and a corresponding slot formed on an opposite side surface of the backbone, wherein the slot is configured to slidingly or snappingly engage a dovetail portion of the backbone of the second LC format optical connector.

18. The LC format optical connector of claim 1, wherein a first portion of the latch is connected to the outer shell near the front face and a second portion of the latch is connected to the outer shell near an opposite end of the outer shell.

19. The LC format optical connector according to claim 1, wherein the backbone is configured to clamp onto an FRP cable.

20. An optical connector for terminating an optical fiber, comprising:
    a housing including an outer shell and a front face configured to mate with a receptacle of a corresponding format;
    a backbone configured to engage an outer surface of the outer shell on a first portion thereof and that includes a mounting structure disposed on a second portion thereof;
    a boot configured to engage the mounting structure of the backbone;

a collar body disposed in the housing and retained between the outer shell and the backbone, wherein the collar body includes a fiber stub disposed in a first portion of the collar body, the fiber stub being mounted in a ferrule and having a first end proximate to an end face of the ferrule and a second end, wherein the collar body includes rear portion having a slot formed in an outer surface at a rear end port thereof; and a mechanical splice disposed in a second portion of the collar body, the mechanical splice configured to splice the second end of the fiber stub to the optical fiber, wherein the backbone also includes a fiber jacket clamping portion to clamp a jacket portion that surrounds a portion of the optical fiber upon actuation, and wherein the boot actuates the fiber jacket clamping portion of the backbone upon attachment to the backbone.

21. An optical connector for terminating an optical fiber from an FRP cable, comprising:

a housing including an outer shell and a front face configured to mate with a receptacle of a corresponding format;

a backbone configured to engage an outer surface of the outer shell on a first portion thereof and that includes a mounting structure disposed on a second portion thereof;

a boot configured to engage the mounting structure of the backbone;

a collar body disposed in the housing and retained between the outer shell and the backbone, wherein the collar body includes a fiber stub disposed in a first portion of the collar body, the fiber stub being mounted in a ferrule and having a first end proximate to an end face of the ferrule and a second end, wherein the collar body includes rear portion having a slot formed in an outer surface at a rear end port thereof; and a mechanical splice disposed in a second portion of the collar body, the mechanical splice configured to splice the second end of the fiber stub to the optical fiber, wherein the backbone also includes a fiber jacket clamping portion to clamp a jacket portion that surrounds a portion of the optical fiber upon actuation, and wherein the boot actuates the fiber jacket clamping portion of the backbone upon attachment to the backbone.

22. The optical connector of claim 21, wherein the fiber jacket clamping portion includes a set of edged protrusions formed on an inner surface thereof.

* * * * *